(12) United States Patent
Matsue et al.

(10) Patent No.: US 8,924,886 B2
(45) Date of Patent: Dec. 30, 2014

(54) IMAGE DISPLAY DEVICE AND IMAGE DISPLAY METHOD

(75) Inventors: Kenji Matsue, Nasushiobara (JP); Kenichi Niwa, Otawara (JP); Muneyasu Kazuno, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 754 days.

(21) Appl. No.: 12/612,997

(22) Filed: Nov. 5, 2009

(65) Prior Publication Data

US 2010/0122206 A1 May 13, 2010

(30) Foreign Application Priority Data

Nov. 13, 2008 (JP) ................. 2008-290558

(51) Int. Cl.
*G06F 3/048* (2013.01)
*G09G 5/00* (2006.01)
*H04N 1/00* (2006.01)

(52) U.S. Cl.
CPC ......... *H04N 1/0344* (2013.01); *H04N 1/00129* (2013.01); *H04N 1/00389* (2013.01); *H04N 1/0044* (2013.01); *Y10S 715/973* (2013.01)
USPC ............ 715/784; 715/830; 715/973; 345/684

(58) Field of Classification Search
CPC .......................... H04N 1/00458; G06F 3/0485
USPC .......................... 715/784–787, 830, 832, 973; 345/684–688
See application file for complete search history.

(56) References Cited

U.S. PATENT DOCUMENTS 4,574,364 A * 3/1986 Tabata et al. .................. 715/798
5,757,381 A * 5/1998 Shoji et al. .................... 345/684

(Continued)

FOREIGN PATENT DOCUMENTS

JP    2005-316990    11/2005
JP    2007-293044    11/2007

OTHER PUBLICATIONS

Raman et al., "Radiology on handheld devices: Image Display, Manipulation and PACS Integration Issues", Radiographics 2004, 24:299-310, copyright RSNA 2004.*

(Continued)

*Primary Examiner* — Omar Abdul-Ali
*Assistant Examiner* — Andrew Tank
(74) *Attorney, Agent, or Firm* — Oblon, Spivak, McClelland, Maier & Neustadt, L.L.P.

(57) ABSTRACT

An image display device connected to an image archive device that stores multiple image data, the image display device comprising: a memory that stores address information of said multiple image data; a display part that is capable of scroll-displaying said image data in a predefined order; a manipulation part for inputting an instruction regarding the scroll display of the image data displayed on said display part; and an image display controller that determines image data to be read from said image archive device depending on the image data and scrolling speed of a display object designated with an instruction that has been input by said manipulation part, reads the image data from said image archive device based on said address information, and also causes said display part to display the image data of a new display object from among the image data that have been read.

9 Claims, 13 Drawing Sheets

(56) References Cited

U.S. PATENT DOCUMENTS

| | | | |
|---|---|---|---|
| 6,847,388 B2 * | 1/2005 | Anderson | 715/854 |
| 7,034,839 B2 * | 4/2006 | Morishita | 345/555 |
| 7,092,970 B2 * | 8/2006 | Shiibashi et al. | 1/1 |
| 7,577,282 B2 * | 8/2009 | Gkanatsios et al. | 382/128 |
| 7,646,927 B2 * | 1/2010 | Matsubara | 382/233 |
| 7,750,927 B2 * | 7/2010 | Ito et al. | 345/688 |
| 7,808,514 B2 * | 10/2010 | Yu et al. | 345/684 |
| 7,900,157 B2 * | 3/2011 | Takeshima et al. | 715/786 |
| 8,022,970 B2 * | 9/2011 | Odagawa | 345/684 |
| 8,150,175 B2 * | 4/2012 | Natanzon et al. | 382/232 |
| 8,209,605 B2 * | 6/2012 | Poston et al. | 715/273 |
| 8,300,050 B2 * | 10/2012 | Falco, Jr. | 345/428 |
| 8,438,496 B1 * | 5/2013 | Hegde | 715/785 |
| 2008/0229235 A1 * | 9/2008 | Vau et al. | 715/784 |
| 2010/0107066 A1 * | 4/2010 | Hiitola et al. | 715/702 |

OTHER PUBLICATIONS

P. Fränti, E. Ageenko, P. Kopylov, S. Gröhn and F. Berger, "Map image compression for real-time applications", Joint Int. Symposium on Geospatial Theory, Processing and Applications (Geomatics 2002), Ottawa, Canada, Jul. 2002.*

* cited by examiner

FIG. 2

Table 1 (utilizing irreversible compression)

| image scrolling speed | image added to image list to be read | receiving priority |
|---|---|---|
| slow | • target image of display request (irreversibly compressed) | high |
| | • precedent and subsequent images of target image of display request (irreversibly compressed) | middle |
| | • target image of display request (uncompressed) | middle |
| | • precedent and subsequent images of target image of display request (uncompressed) | low |
| fast | • target image of display request | high |

FIG. 3

Table 2 (utilizing uncompression)

| image scrolling speed | image added to image list to be read | receiving priority |
|---|---|---|
| slow | • target image of display request (uncompressed) | high |
| | • precedent and subsequent images of target image of display request (uncompressed) | low |
| fast | • target image of display request | high |

FIG. 4

Example of image list to be read

| image UID | location of image | receiving priority |
|---|---|---|
| 1 | http://NAS/Folder1/1.dcm | high |
| 2 | http://NAS/Folder1/2.dcm | middle |
| 3 | http://NAS/Folder1/3.dcm | low |
| 4 | http://NAS/Folder2/4.dcm | middle |
| 5 | http://NAS/Folder2/5.dcm | low |
| 6 | http://NAS/Folder3/6.dcm | low |
| 7 | http://NAS/Folder3/7.dcm | high |

Order of addition: Preceden → Subsequent

FIG. 6

Table 3 (in case of flipping in forward order)

| image flipping speed | image added to image list to be read | receiving priority |
|---|---|---|
| slow | • target image of display request (irreversibly compressed) | 1 |
| | • target image of display request (uncompressed) | 2 |
| | • subsequent images of target image of display request (irreversibly compressed) | 3 |
| | • precedent images of target image of display request (irreversibly compressed) | 4 |
| | • subsequent images of target image of display request (uncompressed) | 5 |
| | • precedent images of target image of display request (uncompressed) | 6 |
| fast | • target image of display request | 1 |

FIG. 10

Table 4 (in case of flipping in backward order)

| image flipping speed | image added to image list to be read | receiving priority |
|---|---|---|
| slow | • target image of display request (irreversibly compressed) | 1 |
| | • target image of display request (uncompressed) | 2 |
| | • precedent and subsequent images of target image of display request (irreversibly compressed)) <br> – order of forward, backward, forward and backward | 3 |
| | • precedent and subsequent images of target image of display request (uncompressed) <br> order of forward, backward, forward and backward | 4 |
| fast | • target image of display request | 1 |

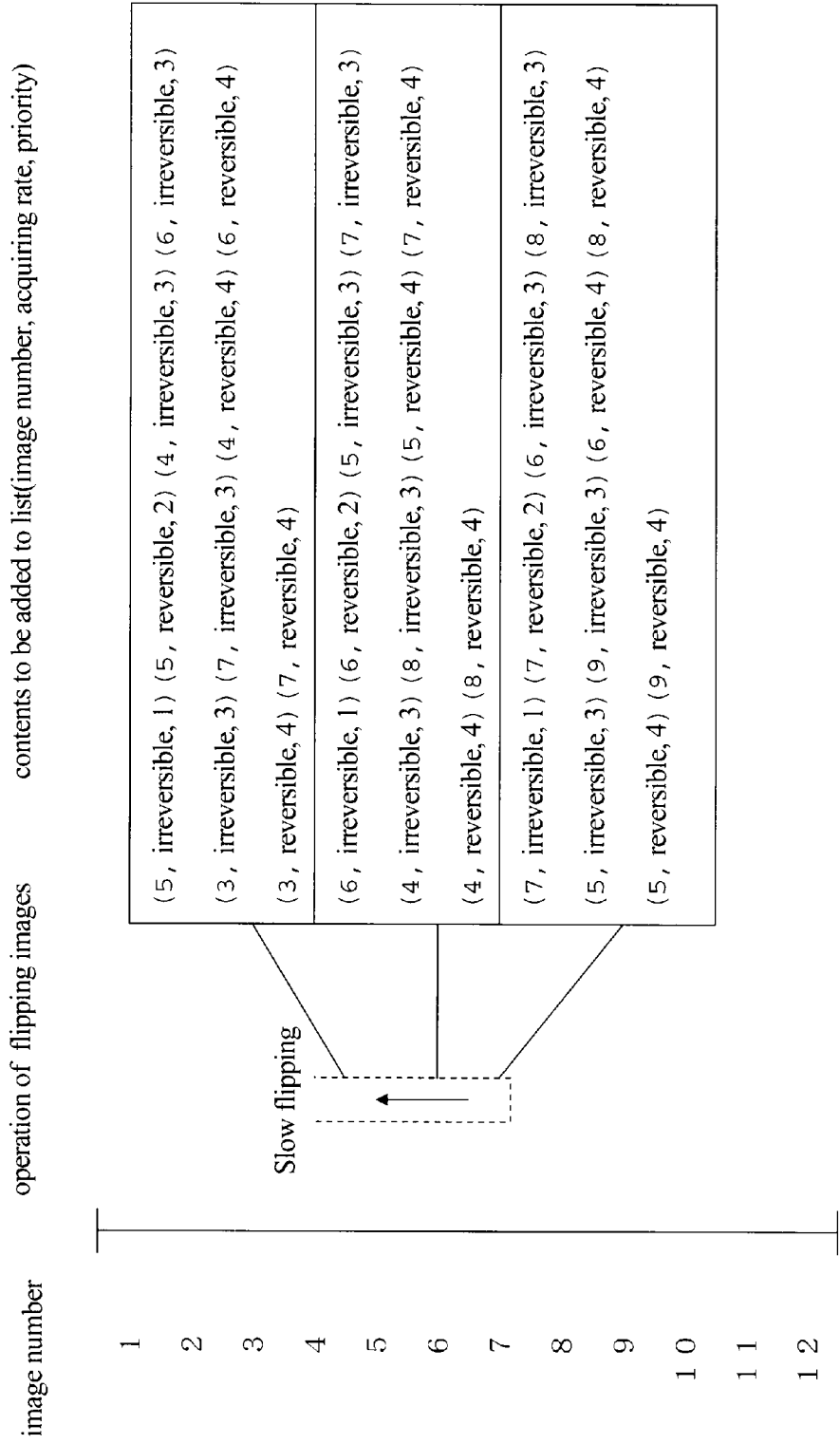

IMAGE DISPLAY DEVICE AND IMAGE DISPLAY METHOD

BACKGROUND OF THE INVENTION

1. Field of the Invention

The present invention relates to an image display device, particularly to an image display device connected to an image archive device that stores multiple image data.

2. Description of the Related Art

There have heretofore been medical image display devices that display medical images. Such medical image display devices acquire an image to be displayed from a medical image archive device connected to a network. This image acquisition is generally of an on-demand type, in which a user designates a required image using web technology or the like and receives that image only.

Moreover, conventional technologies (e.g., Japanese published unexamined application No. 2005-316990) include picture archiving and communication systems (PACS). In this system, a medical imaging device such as an X-ray CT (computed tomography) device or an MRI (magnetic resonance imaging) device, an image archive device as a file server, and a work station are connected together via a LAN (local area network). Image data generated from the medical imaging device are sent to the image archive device. The work station requests the image archive device to send data, receives image data via LAN, and displays an image on a monitor.

Images sent from the image archive device to the work station via the LAN include uncompressed images in which image data are not compressed as well as reversible and irreversible images in which image data are compressed. Higher levels of compressibility of the image data result in lower data volume and reductions in the time generally required for reception.

A reversibly compressed image is a compressed image that can be compressed without losing any of the original data and can completely restore the original data. On the other hand, an irreversibly compressed image is a compressed image in which the image before compression and the image after compression and decompression are not completely matched. An irreversibly compressed image can obtain higher compressibility than a reversibly compressed image, allowing the data volume to be smaller.

As a measure for enhancing the image display speed of the work station between receiving image data from the image archive device and displaying it on the monitor, there is a method of receiving irreversibly compressed images with smaller data volumes. However, this involves the disadvantage of deteriorating the quality of the displayed images.

The image compression technology known as JPEG2000 (Joint Photographic Experts Group 2000) can perform reversible compression and irreversible compression freely, making it possible to completely restore the original image and thereby resolving the disadvantage of deteriorating the quality of the displayed images.

However, with the aforementioned conventional image display device, when image data are designated via an input from a manipulation part, those designated image data are received from the image archive device and the received image data are displayed. Thus, there has been a problem that it takes time to complete the display of the image data after designating the image data.

Moreover, if a portion of a file is acquired using JPEG 2000 image compression technology, there has been a problem that the user is required to perform special manipulations in order to scroll an irreversibly compressed image into an uncompressed image.

SUMMARY OF THE INVENTION

The present invention has been designed to resolve the aforementioned problem and is intended to provide an image display device that is capable of receiving required image data in advance from an image management device without a user being aware of it.

The first aspect of the present invention is an image display device connected to an image archive device that stores multiple image data, the image display device comprising: a memory configured to store address information of said multiple image data; a display part configured to scroll-display said image data in a predefined order; a manipulation part configured to input an instruction regarding the scroll display of the image data displayed on said display part; and an image display controller configured to determine image data to be read from said image archive device depending on the image data and scrolling speed of a display object designated by said manipulation part, read the image data from said image archive device based on said address information, and cause said display part to display the image data of a new display object from among the image data that have been read.

According to this first aspect, based on the image data and scrolling speed of the designated display object, image data predicted to be displayed can be read from the image management device to the image display device in advance.

Moreover, the second aspect of the present invention is the image display device according to the first aspect, wherein said image display controller is configured to determine an image to be read according to which segment of multiple stages said scrolling speed is classified into, and if the scrolling speed designated by said manipulation part is classified into a relatively slow segment, said image display controller is configured to read multiple image data preceding and subsequent to the image data of said display object in said predefined order in addition to the image data of said new display object.

Moreover, the third aspect of the present invention is the image display device according to the second aspect, the image display device according to the second aspect, said image display controller is configured to read only the image data of said new display object if the scrolling speed designated by said manipulation part is classified into a relatively fast segment.

Moreover, the fourth aspect of the present invention is the image display device according to the second aspect, wherein said image display controller is configured to read, in an order based on a pre-set order of priority, multiple image data, which is to be read when the scrolling speed designated by said manipulation part is classified into the relatively slow segment.

Moreover, the fifth aspect of the present invention is the image display device according to the fourth aspect, wherein said image display controller is configured to set, from among a plurality of said orders of priority that have been predefined, an order of priority when said scrolling speed is classified into said relatively slow segment.

Moreover, the sixth aspect of the present invention is the image display device according to the fifth aspect, wherein said image display controller is configured to set said order of priority with respect to the image data displayed on said display part, distinguishing cases of a forward direction, in which the image data is scrolled and displayed in said predefined order, from cases of a reverse direction, in which the image data is scrolled and displayed opposite to said predefined order.

Moreover, the seventh aspect of the present invention is the image display device according to the sixth aspect, wherein said image display controller is configured to set said order of priority based on the number of scrolls between said forward direction and said reverse direction.

Moreover, the eighth aspect of the present invention is the image display device according to the first illustrative embodiment, wherein: said image data consist of multiple image data with different levels of compressibility for the same image; and said image display controller is configured to determine which image data of which level of compressibility are read depending on the scrolling speed designated by said manipulation part.

Moreover, the ninth aspect of the present invention is the image display device according to the first illustrative embodiment, wherein: said multiple image data consist of multiple types of image data with different levels of compressibility for the same image; and said image display controller is configured to determine said type of image data to be read according to which segment of multiple stages said scrolling speed is classified into, wherein if the scrolling speed designated by said manipulation part is classified into a relatively slow segment, image data with high compressibility is preferentially read.

Moreover, the tenth aspect of the present invention is the image display device according to the ninth illustrative embodiment, wherein said image display controller is configured to change the image data to be displayed on said display part into data with low compressibility if said image display controller has read image data with lower compressibility than the image data being displayed on said display part.

BRIEF DESCRIPTION OF THE DRAWINGS

FIG. 2 is a diagram showing one example of a table 1 that constitutes a memory according to the embodiment of the present invention.

FIG. 3 is a diagram showing one example of a table 2 that constitutes the memory according to the embodiment of the present invention.

FIG. 4 is a diagram showing one example of a list that constitutes the memory according to the embodiment of the present invention.

FIG. 6 is a diagram showing one example of a table 3 that constitutes the memory according to the embodiment of the present invention.

FIG. 10 is a diagram showing one example of a table 4 that constitutes the memory according to the embodiment of the present invention.

FIG. 11 is a diagram showing contents added to the list when images are flipped through slowly in the reverse direction in the image display device according to the embodiment of the present invention.

DETAILED DESCRIPTION OF THE EMBODIMENTS

Configuration

Next, the image display device according to one embodiment of the present invention will be described with reference to the respective figures.

Figure 1:
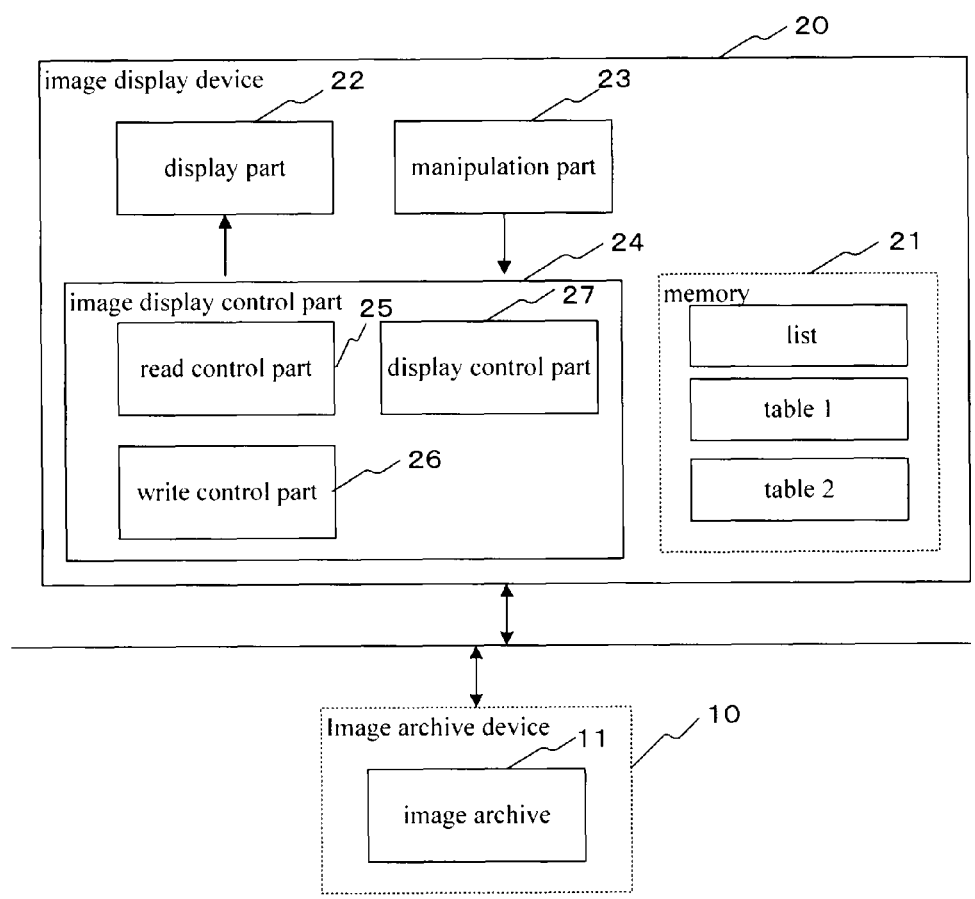
FIG. 1 is a block diagram showing the configuration of an image display device according to one embodiment of the present invention.

First, the configuration of the image display device is described with reference to FIG. 1. FIG. 1 is a block diagram showing the configuration of the image display device according to one embodiment of the present invention.

An image archive device 10 and an image display device 20 are connected to a network. To that network, medical imaging devices, such as an X-ray diagnostic device, X-ray CT, MRI, a nuclear medicine diagnostic device, and an ultrasound diagnostic device are connected. In addition, each medical imaging device may have the image archive device 10 or the image display device 20.

The image archive device 10 has an image archive 11 that stores image data acquired by each medical imaging device. The image archive device 10 has a management part that performs management, such as storing and providing image data. In addition, the management part and the image archive 11 may be installed on separate devices. Address information of image data on the network may be designated by "domain name", "directory name", and "file name". In FIG. 4, the address information of the image data is shown as the location of the images.

The image display device 20 has a memory 21 that stores address information of multiple image data, a display part 22 that is capable of scroll-displaying image data in a predefined order, a manipulation part 23 for inputting an instruction regarding scroll display of the image data displayed on the display part 22, and an image display control part 24. The display part 22, the manipulation part 23, and the image display control part 24 may be installed on separate devices. Having the image display control part 24 as a separate device enables the construction of a thin-client/server system that further reduces the processing load of a client, which is the image display device 20. The memory 21 has a list that stores image data information. The image data information stored in the list includes an image UID (user identifier), the location of the image (address information of image data), and the receiving priority of the image. The image data information stored in the list is shown in FIG. 4. The manipulation part 23 includes a point device, such as a mouse or a track ball, that designates and inputs a position (coordinate) on the screen of the display part 22.

The image display control part 24 determines image data to be read from the image archive device 10 depending on the image data and scrolling speed of a display object designated by the manipulation part 23, reads the image data from the image archive device 10 based on the address information of the image data, and also causes the display part 22 to display the image data of a new display object among the image data that have been read.

Herein, the image data of the display object refers to image data that have been actually displayed on the display part 22. Moreover, the image data of the new display object refers to image data that should be newly displayed on the display part 22.

One example of the configuration of the image display control part 24 will now be described with reference to FIGS. 2 to 4. FIG. 2 is a diagram showing one example of a table 1 that has stored images to be added to the list and the priority of those images corresponding to the scrolling speed of the image data when using irreversibly compressed images; FIG. 3 is a diagram showing one example of a table 2 that has stored images to be added to the list and the priority of those images corresponding to the scrolling speed of the image data when using uncompressed images; and FIG. 4 is a diagram showing one example of the list that has stored image data that will be received.

The image display control part 24 has a read control part 25, a write control part 26, and a display control part 27.

The display control part 27 causes the display part 22 to display the image data of the display object, a cursor, and a slider bar. In this case, when the cursor is moved on the slider with a mouse, which is the manipulation part 23, and the mouse is clicked, the read control part 25 designates the image data of the display object in response to the input of the mouse.

Moreover, in response to the manipulation speed of the mouse or wheel mouse, the scrolling speed of the image data is designated. In addition, the manipulation speed of the manipulation part 23, the scrolling speed of the image data, and the scroll display speed correspond to one another.

The image display control part 24 determines an image to be read according to which segment of multiple stages the scrolling speed is classified into. In the present embodiment, the scrolling speed has been classified in advance into two segments: a "slow" segment, which is relatively slow, and a "fast" segment, which is relatively fast. In addition, the scrolling speed may be classified into three or more segments. Moreover, the read control part 25 may designate the scrolling speed according to the type of the manipulation part 23. For example, the read control part 25 may designate "fast" for the scrolling speed when receiving an input from a mouse and designate "slow" for the scrolling speed when receiving an input from a wheel mouse.

If the scrolling speed designated by the manipulation part 23 is classified into the relatively slow segment, the image display control part 24 reads the precedent and subsequent image data in the predefined order in addition to the image data of the new display object. Because the scrolling speed is relatively slow, there is extra time available for reading the image data from the image archive device 10 and it is possible to read images predicted to be displayed.

Further, the image display control part 24 reads only the image data of the new display object if the scrolling speed designated by the manipulation part is classified into the relatively fast segment. This allows the display control part 27 to cause the display part 22 to display only the image of the new display object in a short time.

On the other hand, the image display control part 24, in an order based on a pre-set order of priority, reads multiple image data to be read when the scrolling speed designated by the manipulation part is classified into the relatively slow segment. By reading in the order based on the order of priority, it can efficiently read an image predicted to be displayed.

The image data to be read consist of multiple image data with different levels of compressibility for the same image, for example, the respective data for uncompressed images, reversibly compressed images, and irreversibly compressed images. The image display control part 24 determines which image data with which level of compressibility are read depending on the scrolling speed designated by the manipulation part 23. It can determine the time for reading the image data from the image archive device 10 depending on the scrolling speed, which allows for accurately reading the image predicted to be displayed.

Next, a detailed description will be provided, with reference to FIGS. 2 to 4, of when the image display control part 24 reads the image data from the image archive device 10 based on the designated image data and scrolling speed thereof.

First, a case in which the designated image data are data of irreversibly compressed images is described. When the designated image data are utilizing data of irreversibly compressed images, the write control part 26 refers to the table 1.

The write control part 26 refers to the table 1, determines the image data to be read from the image archive device 10 based on the scrolling speed, and writes the information of the image data in a list of a memory 12. The table 1 is shown in FIG. 2, in which the designated scrolling speed is classified into a "slow" segment, which is relatively slow, and a "fast" segment, which is relatively fast, and the type of images to be written in the list and the receiving priority of each type are stored Herein, the relatively fast segment refers to the range of faster manipulation speeds if the range of manipulation speeds of the manipulation part 23 is segmented by an intermediate value (threshold). Moreover, the relatively slow segment refers to the range of slower manipulation speeds when the range of manipulation speed of the manipulation part 23 is segmented by an intermediate value.

The image display part 27 preferentially reads image data with high compressibility from the list created by the write control part 26 if the scrolling speed is "slow". It is possible to reliably read the image requested for display because image data with high compressibility and small data volume are preferentially read in a short time.

The image display control part 24 determines the type of image to be written into the list and the receiving priority as follows if the designated scrolling speed is "slow". For example, a (irreversibly compressed) target image of a display request is determined to be of a "high" receiving priority, several images preceding and subsequent to the (irreversibly compressed) target image of a display request to be of a "medium" receiving priority, a (uncompressed) target image of a display request to be of a "medium" receiving priority, and several images preceding and subsequent to the (uncompressed) target image of a display request to be of a "low" receiving priority. This allows the display control part 27 to preferentially read the (irreversibly compressed) target image from the image archive device 10 by referring to the list and cause the display part 22 to display the read target image.

Herein, the type of image refers to the type of data format. Moreover, several images preceding and subsequent to the target image refer to images of several frames preceding and subsequent to the frame of the target image when the unit of an image is 1 frame. In this case, the scrolling speed refers to the speed of scrolling frames per unit time.

Images with smaller data volumes are set with higher receiving priorities. Moreover, images closer to the image data of the new display object are set with higher receiving priorities. In addition, the number of images preceding and subsequent to the target image of a display request may be determined in advance, and the number of images preceding and subsequent to the target image of a display request may be changeable after it is set. The number of precedent and subsequent images are set according to data volume, communication speed, available memory, etc.

Moreover, if the designated scrolling speed is "fast", the image display control part 24 determines the type of images to be written in the list and the receiving priority, such as, for example, an (irreversibly compressed) image of the new display object and a "high" receiving priority. There is no other type of images to be written in the list. Because the write control part 26 writes only the image data of the new display object in the list, the display control part 27 can read only the image data of the new display object from the image archive device 10 in a short time and cause the display part 22 to display only the image data of the new display object that have been read.

Next, a case in which the designated image data are data of uncompressed images will be described. When the designated image data utilize data of uncompressed images, the write control part 26 refers to the table 2.

The write control part 26 refers to the table 2, determines the image data to be read from the image archive device 10 based on the scrolling speed, and writes the information of the image data in a list of the memory 12. The table 2 is shown in FIG. 3, in which the designated scrolling speeds are classified into "slow" and "fast" and the types of images to be written in the list and the receiving priority of each type are stored.

If the designated scrolling speed is "slow", the type of image and the receiving priority to be written in the list are determined as follows. For example, a (uncompressed) target image of a display request is determined to be of a "high" receiving priority, and several images preceding and subsequent to the (uncompressed) target image of a display request to be of a "low" receiving priority. Images closer to the image data of the new display object are set in advance with a higher receiving priority.

Moreover, if the designated scrolling speed is "fast", for the type of image and the receiving priority to be written into the list, an (uncompressed) image of the new object is set to be of a "high" receiving priority, for example. There is no other type of image to be written into the list.

The display control part 27 reads the image data from the image archive device 10 based on the address information of the image data written in the list and causes the display part 22 to display them. The image display control part 24 deletes from the list the address information of the image data that have been read or excludes it from the objects to be read without deleting it. This precludes reading unnecessary images from the image archive device 10.

The image display control part 24 changes the image data to be displayed on the display part 22 into those with low compressibility if it has read image data with lower compressibility than the image data being displayed on the display part 22. This allows for improving the quality of the displayed images without requiring any special operation by the user.

For example, if the display control part 27 has completed reading an irreversibly compressed image, it further reads an uncompressed image or a reversibly compressed image corresponding to the irreversibly compressed image, thereby improving the quality of an image displayed on the display part 22. As an example thereof, if reading of an irreversibly compressed image (partial image data) according to JPEG2000 is completed, an uncompressed image or a reversibly compressed image (complete image data) is read. This allows the user to scroll from the irreversibly compressed image to the uncompressed image or the reversibly compressed image without performing any special operation.

The order in which the display control part 27 reads the image data written in the list from the image archive device 10 will now be described with reference to FIG. 4. When the image data are written in the list in the order from 1 to 7 of the image UID, the display control part 27 preferentially reads the image data with high receiving priorities. If the receiving priority is the same, the last image data written into the list is read first.

In the list shown in FIG. 4, in the order from 1 to 7 of the image UID, information of the image data, in which the receiving priorities of the image data are high, medium, low, medium, low, low, and high, respectively, is written. In this case, the display control part 27 reads the image data from the image archive device 10 in the order in which the image UID thereof is 7, 1, 4, 2, 6, 5, and 3.

It has been described above that the image display control part 24, which performs writing, refers to the tables 1 and 2 that store the types of images to be written into the list and the receiving priority of each type depending on the designated scrolling speed, determines the image data to be read from the image archive device 10, and writes the information of the image data in the list of the memory 12, but it is not limited to this.

Figure 5:
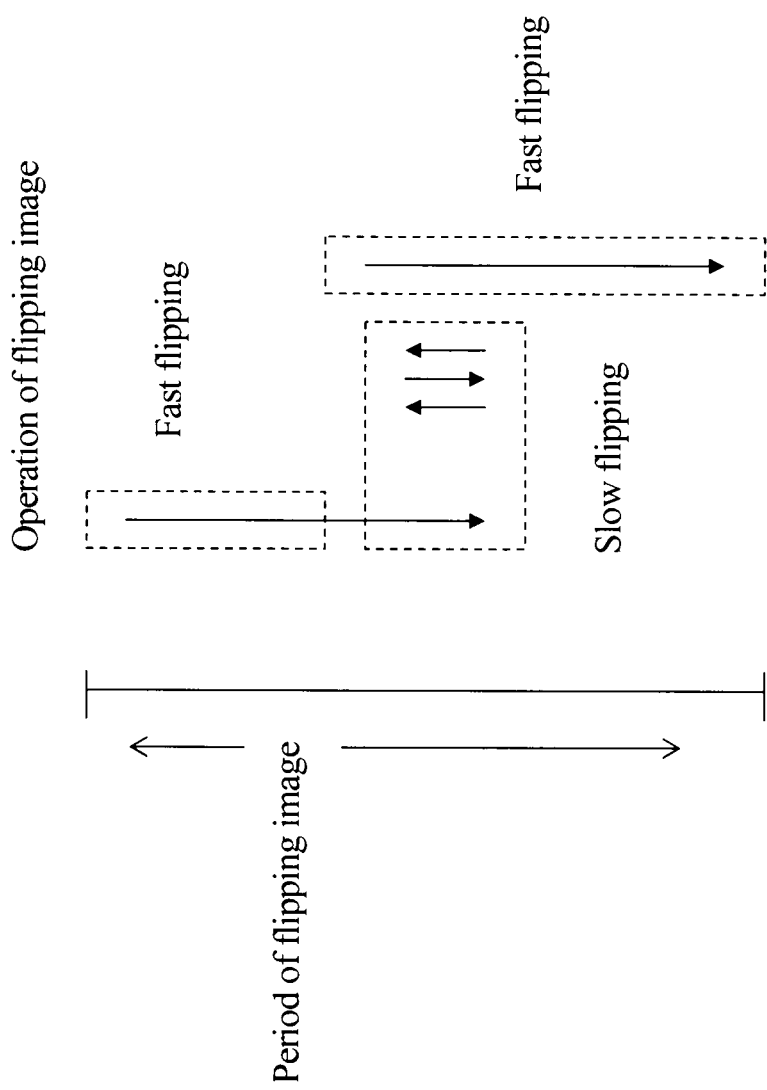
FIG. 5 is a conceptual diagram showing scrolling between forward and reverse directions in the image display device according to the embodiment of the present invention.

Next, the image display control part 24 and tables for separately defining the receiving priority through settings when the designated scrolling speed is slow are described with reference to FIGS. 5 to 12. FIG. 5 is a conceptual diagram showing scrolling between forward and reverse directions.

Figure 7:
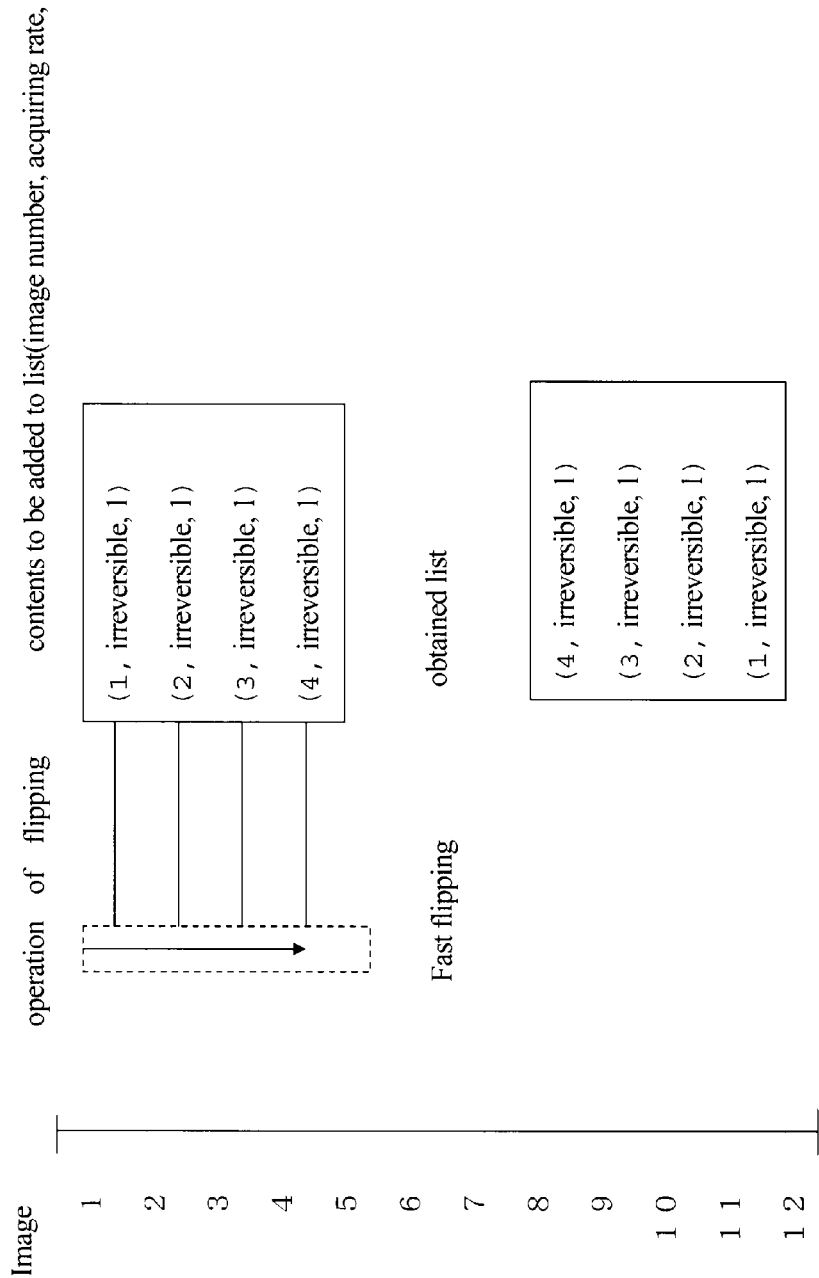
FIG. 7 is a diagram showing contents added to the list and the list created when images are flipped through quickly in the image display device according to the embodiment of the present invention.
Figure 8:
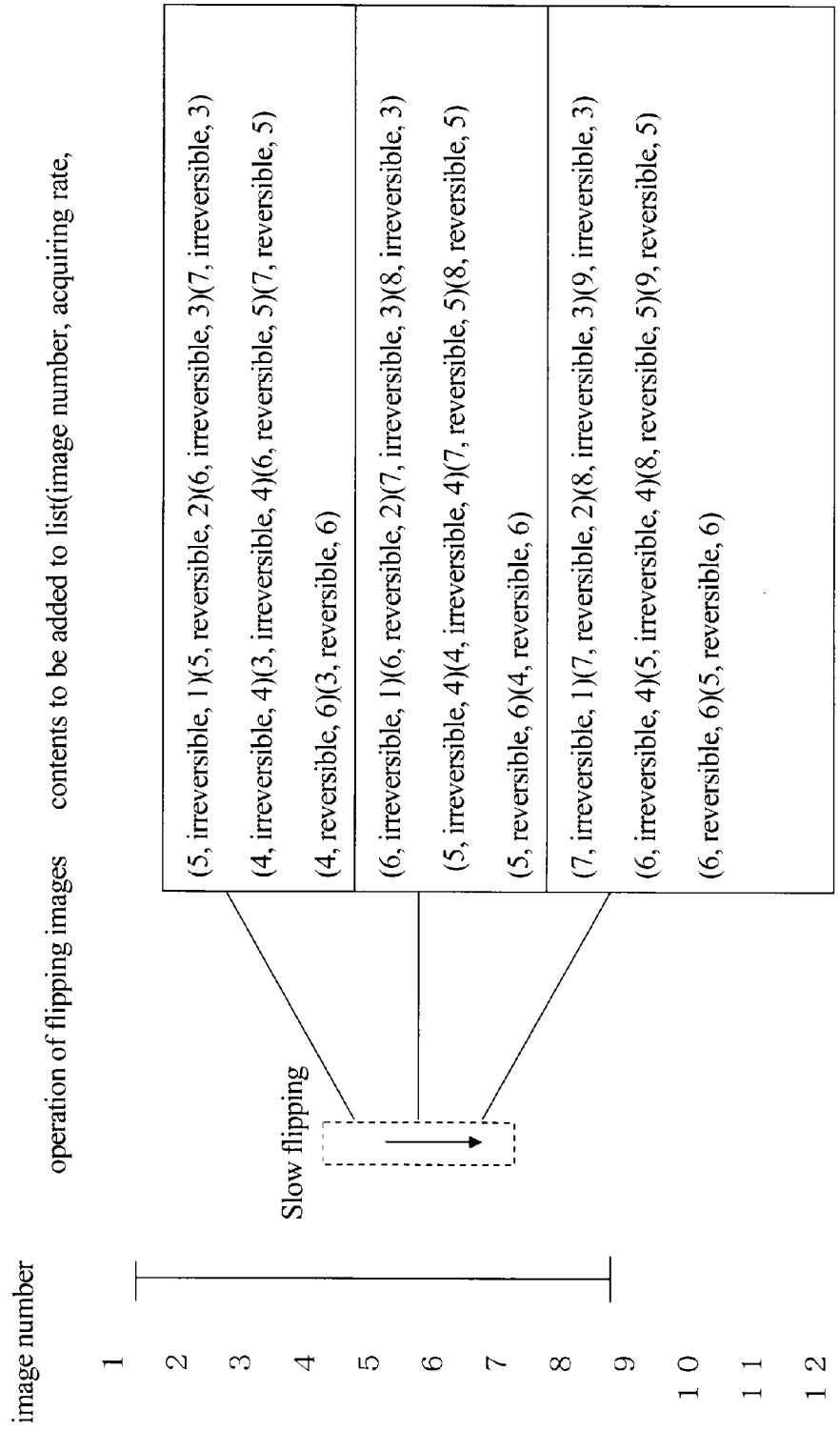
FIG. 8 is a diagram showing contents added to the list when images are flipped through slowly in the forward direction in the image display device according to the embodiment of the present invention.
Figure 9:
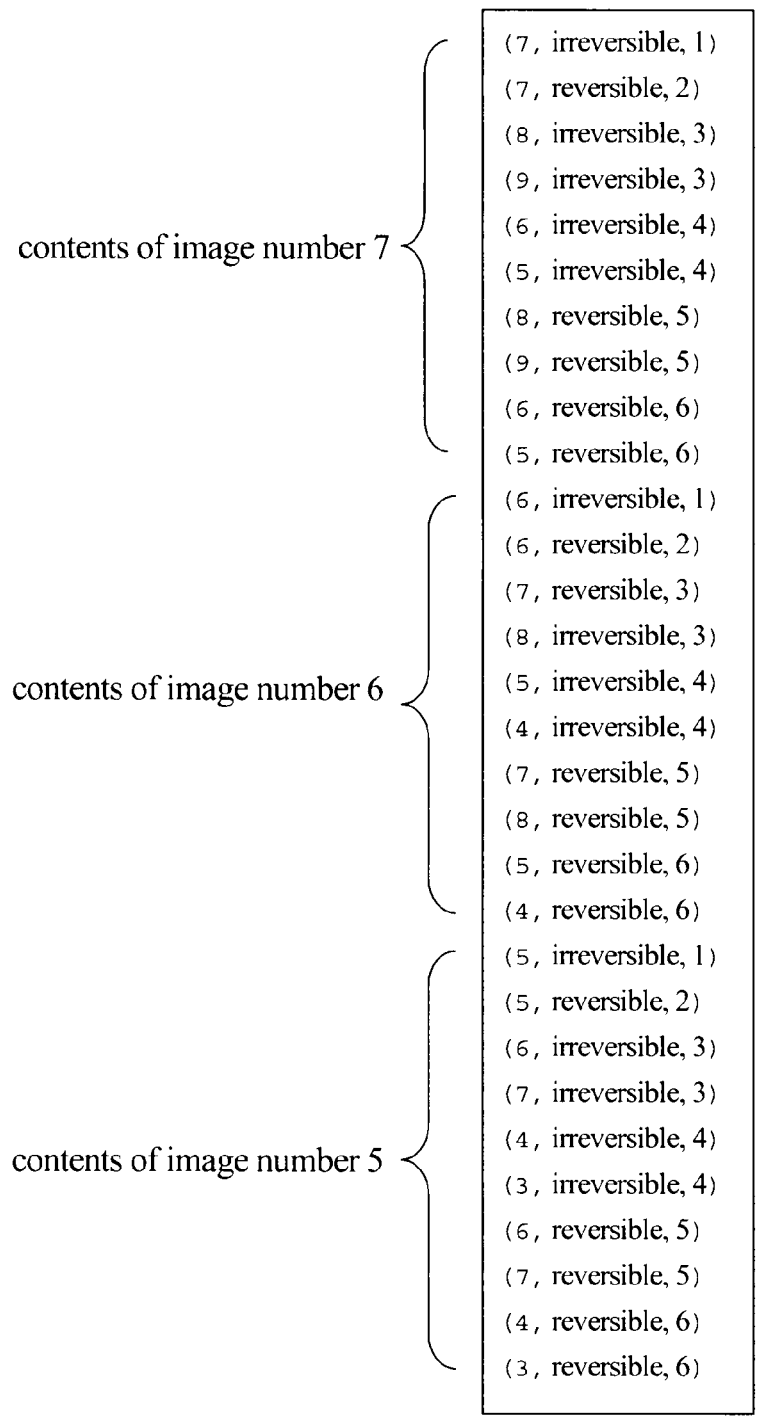
FIG. 9 is a diagram showing the list created when images are flipped through slowly in the forward direction in the image display device according to the embodiment of the present invention.

FIG. 6 is a diagram showing one example of the table 3 utilized when images are flipped through in the forward direction. FIG. 7 is a diagram showing contents added to the list and the list created when images are flipped through quickly in the forward direction. FIG. 8 is a diagram showing contents added to the list and the list created when images are flipped through slowly in the forward direction. FIG. 9 is a diagram showing the list when images are flipped through slowly in the forward direction. FIG. 10 is a diagram showing one example of the table 4 utilized when images are flipped through in the reverse direction. FIG. 11 is a diagram showing contents added to the list when images are flipped through slowly in the reverse direction.

Figure 12:
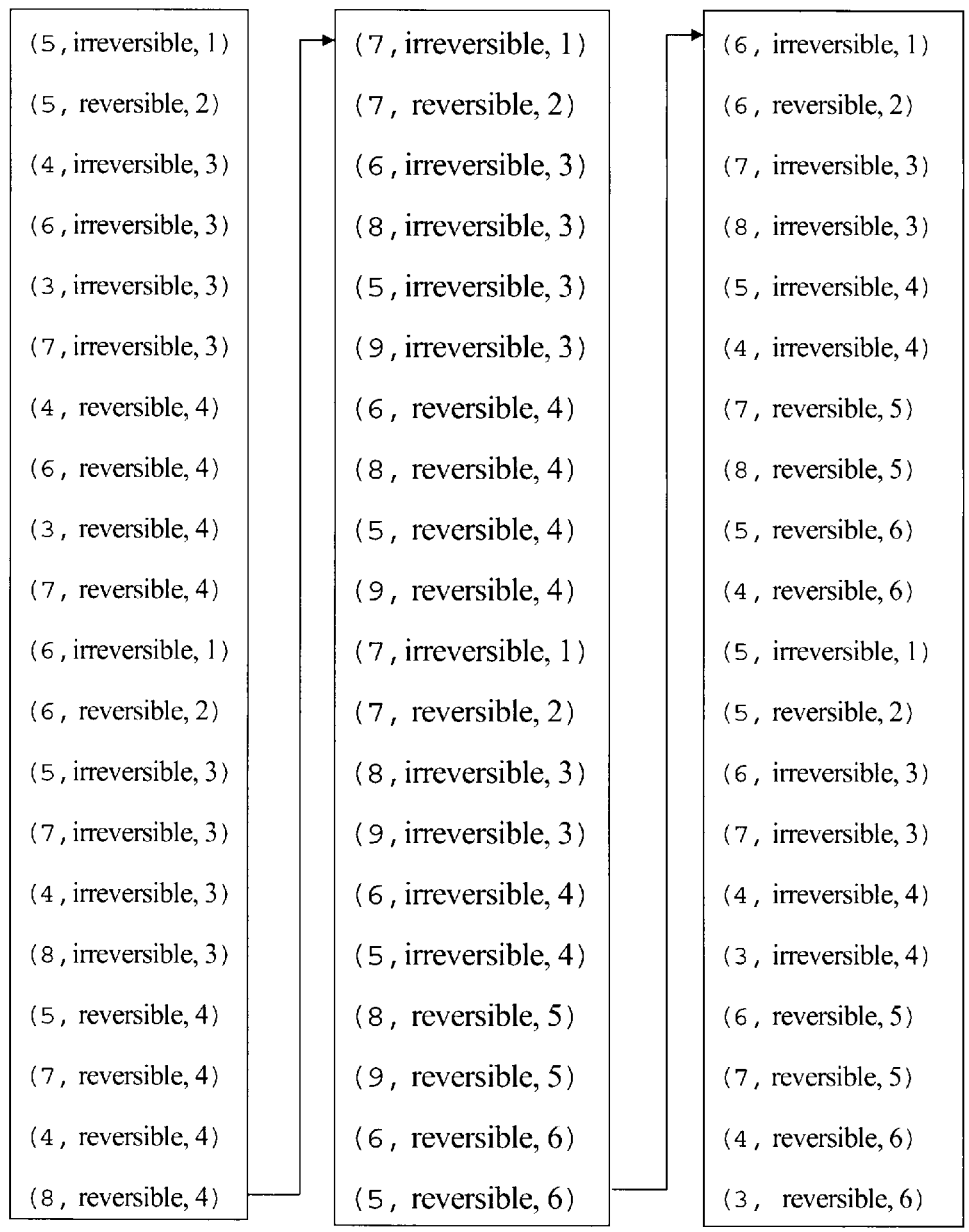
FIG. 12 is a diagram showing the list created when images are flipped through slowly in the forward direction and subsequently flipped through slowly in the reverse direction in the image display device according to the embodiment of the present invention.

FIG. 12 is a diagram showing the list created when images are flipped through slowly in the forward direction and subsequently flipped through slowly in the reverse direction. Herein, flipping through images refers to scroll-displaying of the images.

The image display control part 24, from among a plurality of the orders of priority that have been predefined, sets an order of priority when the aforementioned scrolling speed is classified into the aforementioned relatively slow segment. The image display control part 24 sets the order of priority in response to a designation by the manipulation part 23 or sets the order of priority with respect to the image data displayed on the aforementioned display part, corresponding it to cases of a forward direction, in which precedent image data is scrolled and displayed in the predefined order, and cases of a reverse direction, in which subsequent image data is scrolled and displayed in the predefined order. Herein, the predefined order is a sequence of image data when images are flipped through in the forward direction, such as, for example, an order when the image data are arranged based on the identification numbers attached to the image data acquired via radiography.

Moreover, the image display control part 24 sets the order of priority corresponding to the forward and reverse directions.

A case in which the image display control part 24 sets the order of priority corresponding to the forward and reverse directions will now be described with reference to FIGS. 5 to 12. On the page of FIG. 5, the downward arrow indicates the forward direction and the upward arrow indicates the reverse direction.

First, the table 3 for when the image-flipping direction is the forward direction will be described with reference to FIG. 6. If the image-flipping speed is slow, images added to the list of images to be read and the receiving priority thereof are as follows.

A (irreversibly compressed) target image of a display request has a receiving priority of "1", a (uncompressed) target image of a display request has a receiving priority of "2", several images subsequent to a (irreversibly compressed) target image of a display request have a receiving priority of "3", several images preceding a (irreversibly compressed) target image of a display request have a receiving priority of "4", several images subsequent to a (uncompressed) target image of a display request have a receiving priority of "5", and several images preceding a (uncompressed) target image of a display request have a receiving priority of "6". Moreover, if the image-flipping speed is fast, the target image of a display request has a receiving priority of "1". The rate of acquisition and the details of the receiving priority are shown in FIG. 6.

Next, the list created by the image display control part 24 when the image-flipping speed is fast and the flipping direction is the forward direction will be specifically described with reference to FIGS. 6 and 7. In addition, herein, the "number of precedent and subsequent images" has been set to 2.

Moreover, the predefined orders 1-12 have been attached as image numbers.

As shown in FIG. 7, if the fast image-flipping manipulation is performed toward the image numbers 1-4, the image display control part 24 adds (1, irreversible, 1), (2, irreversible, 1), (3, irreversible, 1), and (4, irreversible, 1), which are the contents of the image number, the rate of acquisition, and receiving priority, based on the table 3 (when the image-flipping speed is fast) shown in FIG. 6. The image display control part 24 builds up the added contents in the list in the order of (1, irreversible, 1), (2, irreversible, 1), (3, irreversible, 1), and (4, irreversible, 1). Since the image-flipping speed is fast, the image display control part 24 reads from the list the image data related to the contents of the displayed image itself at the time (4, irreversible, 1) and receives them from the medical image archive 11, and the display control part 27 causes an image related to the image number 4 to be displayed and does not cause the respective images related to the image numbers 1-3 to be displayed. Herein, the rate of acquisition is a type of image data with different levels of compressibility for the same image. Moreover, in the following description, the image display control part 24 writes the added contents in the list so that they are built up on the contents that have been added immediately prior to them, reads the contents built up in the list in order of high receiving priority and closeness of display position to the displayed image at the time, and receives images data that should be received from the image archive 11 in the image archive device 10.

The above has described the contents created in the list and the contents added to the list by the image display control part 24 when the image-flipping speed is fast.

Next, the contents added to the list and the contents created in the list by the image display control part 24 when the image-flipping speed is slow will be described with reference to FIGS. 8 and 9. In addition, herein, the "number of precedent and subsequent images" has been set to 2. Moreover, the predefined orders have been attached as image numbers 1-12.

If the image-flipping manipulation is performed slowly in the forward direction of the image numbers 5-7, the image display control part 24 adds the following contents (image number, rate of acquisition, and receiving priority) based on the table 3 (when the image-flipping speed is slow) shown in FIG. 6. When the flipped image has the image number 5, the contents added will be (5, irreversible, 1), (5, reversible, 2), (6, irreversible, 3), (7, irreversible, 3), (4, irreversible, 4), (3, irreversible, 4), (6, reversible, 5), (7, reversible, 5), (4, reversible, 6), and (3, reversible, 6) (see FIG. 8). Moreover, the image display control part 24 builds up the contents of (5, irreversible, 1), (5, reversible, 2), (6, irreversible, 3), (7, irreversible, 3), (4, irreversible, 4), (3, irreversible, 4), (6, reversible, 5), (7, reversible, 5), (4, reversible, 6), and (3, reversible, 6) in the list in order (FIG. 9).

Subsequently, when the flipped image has the image number 6, the contents added will be (6, irreversible, 1), (6, reversible, 2), (7, irreversible, 3), (8, irreversible, 3), (5, irreversible, 4), (4, irreversible, 4), (7, reversible, 5), (8, reversible, 5), (5, reversible, 6), and (4, reversible, 6) (see FIG. 8).

Moreover, the image display control part 24 builds up the contents of (6, irreversible, 1), (6, reversible, 2), (7, irreversible, 3), (8, irreversible, 3), (5, irreversible, 4), (4, irreversible, 4), (7, reversible, 5), (8, reversible, 5), (5, reversible, 6), and (4, reversible, 6) (see FIG. 8) in the list in order. The contents when the image number is 6 built up on the contents when the aforementioned image number is 5 are shown in FIG. 9.

Further, subsequently, when the flipped image has the image number 7, the contents added will be (7, irreversible, 1), (7, reversible, 2), (8, irreversible, 3), (9, irreversible, 3), (6, irreversible, 4), (5, irreversible, 4), (8, reversible, 5), (9, reversible, 5), (6, reversible, 6), and (5, reversible, 6) (see FIG. 8). Moreover, the image display control part 24 builds up the contents of (7, irreversible, 1), (7, reversible, 2), (8, irreversible, 3), (9, irreversible, 3), (6, irreversible, 4), (5, irreversible, 4), (8, reversible, 5), (9, reversible, 5), (6, reversible, 6), and (5, reversible, 6) in the list in order. The contents when the image number is 7 built up on the contents when the aforementioned image number is 6 are shown in FIG. 9.

Next, the list added by the image display control part 24 when the image-flipping speed is slow and the flipping direction is the reverse direction will be specifically described with reference to FIGS. 10 to 12. In addition, herein, the "number of precedent and subsequent images" has been set to 2. Moreover, the predefined orders have been attached as image numbers 1-12.

First, the table 4 when the image-flipping direction is the reverse direction will be described with reference to FIG. 10. If the image-flipping speed is slow, images added to the list of images to be read and the receiving priority thereof are as follows.

A (irreversibly compressed) target image of a display request has a receiving priority of "1", a (uncompressed) target image of a display request has a receiving priority of "2", several images preceding and subsequent to a (irreversibly compressed) target image of a display request have a receiving priority of "3", and several images preceding and subsequent to a (uncompressed) target image of a display request have a receiving priority of "4". Herein, the order of priority of several precedent and subsequent images is the backward and forward orders. Moreover, if the image-flipping speed is fast, the target image of a display request has a receiving priority of "1".

If the image-flipping manipulation is performed slowly in the reverse direction of the image numbers 5-7, the image display control part 24 adds the following contents (image number, rate of acquisition, and receiving priority) based on the table 4 (when the image-flipping direction is the reverse direction) shown in FIG. 10 and builds them up in the list in the following order. When the flipped image has the image number 7, the contents added will be (7, irreversible, 1), (7, reversible, 2), (6, irreversible, 3), (8, irreversible, 3), (5, irreversible, 3), (9, irreversible, 3), (6, reversible, 4), (8, reversible, 4), (5, reversible, 4), and (9, reversible, 4) (see FIG. 11).

Moreover, the image display control part 24 builds up the list in the order of (7, irreversible, 1), (7, reversible, 2), (6, irreversible, 3), (8, irreversible, 3), (5, irreversible, 3), (9, irreversible, 3), (6, reversible, 4), (8, reversible, 4), (5, reversible, 4), and (9, reversible, 4) (FIG. 12).

Subsequently, when the flipped image has the image number 6, the contents added will be (6, irreversible, 1), (6, reversible, 2), (5, irreversible, 3), (7, irreversible, 3), (4, irreversible, 3), (8, irreversible, 3), (5, reversible, 4), (7, reversible, 4), (4, reversible, 4), and (8, reversible, 4) (see FIG. 11).

Moreover, the image display control part 24 builds up the list in the order of (6, irreversible, 1), (6, reversible, 2), (5, irreversible, 3), (7, irreversible, 3), (4, irreversible, 3), (8, irreversible, 3), (5, reversible, 4), (7, reversible, 4), (4, reversible, 4), and (8, reversible, 4). The contents of the image number 6 built up on the contents when the image number is 5 are shown in FIG. 12.

Furthermore, subsequently, when the flipped image has the image number 5, the contents added will be (5, irreversible, 1), (5, reversible, 2), (4, irreversible, 3), (6, irreversible, 3), (3, irreversible, 3), (7, irreversible, 3), (4, reversible, 4), (6, reversible, 4), (3, reversible, 4), and (7, reversible, 4) (see FIG. 11). Moreover, the image display control part 24 builds up the contents of (5, irreversible, 1), (5, reversible, 2), (4, irreversible, 3), (6, irreversible, 3), (3, irreversible, 3), (7, irreversible, 3), (4, reversible, 4), (6, reversible, 4), (3, reversible, 4), and (7, reversible, 4) in the list in order. The contents when the image number is 5 that are built up on the contents when the image number is 6 are shown in FIG. 12.

The above has described that the image display control part 24 sets the receiving priority based on the table 4, which substitutes for the table 3, when scrolling the image-flipping direction from the forward direction to the reverse direction, but without being limited to this, the image display control part 24 may set the receiving priority based on the number of scrolls between the forward and reverse directions. For example, the image display control part 24 may set the receiving priority when the number of scrolls between the forward and reverse directions is one or more, and it may set the receiving priority for each aforementioned number of scrolls, and may furthermore set the receiving priority depending on the aforementioned number of scrolls.

In addition, the image display control part 24 may have the following functions.

For example, the image display control part 24 excludes images that have already been completely received from the image archive device 10 and exist in the list or internal memory of the display part 22 from the objects to be added to the list.

Moreover, when receiving images using the list, for images that have already been completely received from the image archive device 10 and exist in the list or internal memory of the display part 22, the image display control part 24 skips the process of receiving.

Moreover, a list may be prepared for each receiving priority. For example, a list for priority 1 and a list for priority 2 are prepared, and if the image display control part 24 refers to the list for priority 1 and it is empty, it refers to the list for priority 2.

[Operation]

Figure 13:
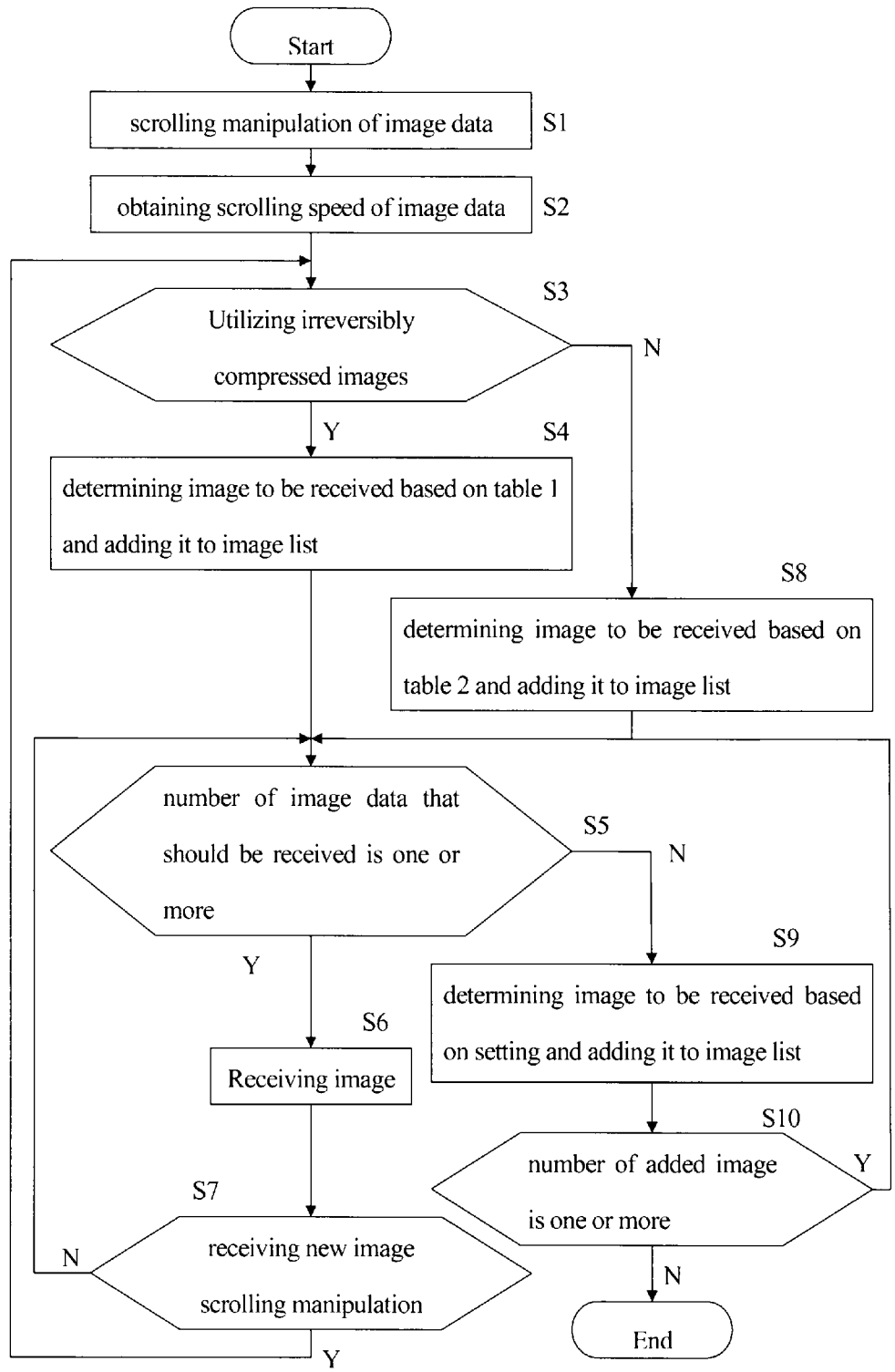
FIG. 13 is a flow chart showing a series of operations of the image display device according to the embodiment of the present invention.

Next, operation of the image display device will be described with reference to FIG. 13. FIG. 13 is a flow chart showing a series of operations of the image display device 20 when corresponding the image data of the display object to the scrolling speed and receiving the image data. The following describes that the image display control part 24 refers to the tables 1 and 2, but it may refer to the tables 3 and 4 as well.

When the display control part 27 is causing the display part 22 to display an image, scrolling manipulation of the image data of the display object is performed by the manipulation part 23 (step S1). In response to the scrolling manipulation, the read control part 25 reads the image data of the display object and the scrolling speed (step S2).

Next, the image display control part 24 determines whether irreversibly compressed images are being utilized based on the type of the image data of the display object (step S3).

If irreversibly compressed image are being utilized (step S3: Y), the write control part 26 refers to the table 1, determines the image data that should be received based on the image data of the display object and the scrolling speed, and adds the information of those image data in the list (step S4).

On the other hand, if uncompressed images are being utilized (step S3: N), the write control part 26 refers to the table 2, determines the image data that should be received based on the image data of the display object and the scrolling speed, and adds the information of those image data in the list (step S8).

Next, if the image display control part 24 checks the presence or absence of information of the image data added to the list and determines that the number of image data that should be received is one or more (step S5: Y), the image display control part 24 receives image data from the image archive 11 in the image archive device 10 based on the address information of the image data (step S6).

Subsequently, the image display control part 24 determines whether a new image scrolling manipulation has been received (step S7). If a new image scrolling manipulation has been received (step S7: Y), it returns to step S2, where the read control part 25 reads the image data of the display object and the scrolling speed. If a new image scrolling manipulation has not been received (step S7: N), it returns to step S5, where the number of image data that should be received is determined by the image display control part 24.

If the image display control part 24 determines that the number of image data that should be received is 0 (step S5: N), it performs operations based on the setting. In the present embodiment, for example, if the scrolling speed has been set to "0", the image display control part 24 determines the image data that should be received and adds the information of those image data and a predefined number of precedent and subsequent image data to the list (step S9). For example, with respect to image data requested for display and several precedent and subsequent image data, the information of the uncompressed image data thereof is added to the list.

If the image display control part 24 checks the presence or absence of information of the image data added to the list and determines that the number of image data that should be received is one or more (step S10: Y), it returns to step S5, where the image display control part 24 refers to the list and determines the number of all the image data that should be received. If the image display control part 24 determines that the number of image data that should be received is zero (step S10: N), the operation is ended.

In addition, a case in which the scrolling speed has been set to zero in the aforementioned step S9 has been shown, but it is not limited to this. A scrolling speed of "0" may be regarded as a "slow" scrolling speed so that the operation returns to step S2, where the scrolling speed is acquired.

In addition, in the series of operations of the image display device 20 described above, even if the display control part 27 is receiving (during the period of reading) the image data from the image archive device 10 at step S7, when the determination of the read control part 25 is received at step S2, the write control part 26 may write the address information of the image data based on that determination in the list at steps S4 and S8. This allows for efficiently receiving the image data from the image archive device 10.

What is claimed is:

1. An image display device, connected via a network to an image archive device that stores multiple image data, to receive the image data from the image archive device, the image display device comprising:
   a memory configured to store address information of said multiple image data;
   a display part configured to scroll-display said image data in a predefined order;
   a manipulation part configured to input an instruction regarding the scroll display of the image data displayed on said display part; and
   an image display controller configured to determine how many frames of the image data are to be read from said image archive device depending on the image data and scrolling speed of a display object designated by said manipulation part, read the image data of the determined number of frames from said image archive device based on said address information and the image data of the display object, and cause said display part to display the image data of the frames of a new display object from among the image data of the determined number of frames that have been read,
   wherein said image display controller is configured to have association information that associates multiple stages of said scrolling speed with readable image data of different compression forms and to determine a readable range of an image to be read according to which stage of the multiple stages said designated scrolling speed is classified into, and
   if the scrolling speed designated by said manipulation part is classified into a relatively slow stage, said image display controller is configured to read multiple image data preceding and subsequent to the image data of each of said display object in said predefined order in addition to the image data of said new display object.

2. The image display device according to claim 1, wherein said image display controller is configured to read only the image data of said new display object if the scrolling speed designated by said manipulation part is classified into a relatively fast stage.

3. The image display device according to claim 1, wherein the association information comprises a priority according to a combination of the designated scrolling speed and image data of different compression formats, wherein said image display controller is configured to read, based on the association information, in an order based on the priority, image data in the determined range, when the scrolling speed designated by said manipulation part is classified into the relatively slow stage.

4. The image display device according to claim 3, wherein said image display controller is configured to determine the range about the image data to be read for each scrolling in order to read the image data in the priority.

5. The image display device according to claim 4, wherein said image display controller is configured to set said order of priority with respect to the image data displayed on said display part, distinguishing cases of a forward direction, in which the image data is scrolled and displayed in said predefined order, from cases of a reverse direction, in which the image data is scrolled and displayed opposite to said predefined order.

6. The image display device according to claim 5, wherein said image display controller is configured to set said order of priority based on the number of scrolls between said forward direction and said reverse direction.

7. An image display device, connected via a network to an image archive device that stores multiple image data, to receive the image data from the image archive device, the image display device comprising:
   a memory configured to store address information of said multiple image data;
   a display part configured to scroll-display said image data in a predefined order;
   a manipulation part configured to input an instruction regarding the scroll display of the image data displayed on said display part; and
   an image display controller configured to determine how many frames of the image data are to be read from said image archive device depending on the image data and scrolling speed of a display object designated by said manipulation part, read the image data of the determined number of frames from said image archive device based on said address information and the image data of the display object, and cause said display part to display the image data of the frames of a new display object from among the image data of the determined number of frames that have been read,
   wherein:
   said image data consist of multiple image data with different levels of compressibility for the same image; and
   said image display controller is configured to determine which image data of which level of compressibility are read depending on the scrolling speed designated by said manipulation part.

8. An image display device, connected via a network to an image archive device that stores multiple image data, to receive the image data from the image archive device, the image display device comprising:
   a memory configured to store address information of said multiple image data;
   a display part configured to scroll-display said image data in a predefined order;
   a manipulation part configured to input an instruction regarding the scroll display of the image data displayed on said display part; and
   an image display controller configured to determine how many frames of the image data are to be read from said image archive device depending on the image data and scrolling speed of a display object designated by said manipulation part, read the image data of the determined number of frames from said image archive device based on said address information and the image data of the display object, and cause said display part to display the image data of the frames of a new display object from among the image data of the determined number of frames that have been read, wherein:

said multiple image data consist of multiple types of image data with different levels of compressibility for the same image; and said image display controller is configured to determine said type of image data to be read according to which segment of multiple stages said scrolling speed is classified into, wherein if the scrolling speed designated by said manipulation part is classified into a relatively slow segment, image data with high compressibility is preferentially read.

9. The image display device according to claim 8, wherein said image display controller is configured to change the image data to be displayed on said display part into data with low compressibility if said image display controller has read image data with lower compressibility than the image data being displayed on said display part.

\* \* \* \* \*